US008807567B2

(12) United States Patent
Lutnick et al.

(10) Patent No.: US 8,807,567 B2
(45) **Date of Patent: *Aug. 19, 2014**

(54) CARD GAME

(75) Inventors: Howard W. Lutnick, New York, NY (US); Dean P. Alderucci, Westpoint, CT (US); Geoffrey M. Gelman, Brooklyn, NY (US)

(73) Assignee: CFPH, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/614,069

(22) Filed: Sep. 13, 2012

(65) Prior Publication Data

US 2013/0127114 A1 May 23, 2013

Related U.S. Application Data

(63) Continuation of application No. 13/176,447, filed on Jul. 5, 2011, which is a continuation of application No. 12/780,163, filed on May 14, 2010, now Pat. No. 7,992,873, which is a continuation of application No. 11/459,199, filed on Jul. 21, 2006, now Pat. No. 7,775,524.

(51) Int. Cl.
*A63F 13/00* (2014.01)

(52) U.S. Cl.
USPC .......... 273/292

(58) Field of Classification Search
USPC .......... 273/292
See application file for complete search history.

(56) References Cited

U.S. PATENT DOCUMENTS

| | | | | |
|---|---|---|---|---|
| 1,723,377 | A * | 8/1929 | Salomon | 273/269 |
| 2,355,785 | A * | 8/1944 | Dorfman | 273/274 |
| 3,618,952 | A * | 11/1971 | Tallarida | 273/269 |
| 3,690,668 | A * | 9/1972 | Weeks et al. | 273/138.1 |
| 4,355,812 | A | 10/1982 | McCullough | |
| 4,364,567 | A * | 12/1982 | Goott | 273/237 |
| 4,560,171 | A * | 12/1985 | Anthony | 273/269 |
| 5,904,353 | A | 5/1999 | Aldridge | |
| 5,997,000 | A | 12/1999 | Nakano et al. | |
| 6,592,125 | B1 | 7/2003 | Lizak | |
| 6,789,796 | B2 | 9/2004 | Cherven | |
| 6,935,952 | B2 | 8/2005 | Walker et al. | |
| 7,775,524 | B2 * | 8/2010 | Lutnick et al. | 273/292 |
| 7,992,873 | B2 * | 8/2011 | Lutnick et al. | 273/292 |
| 8,308,165 | B2 * | 11/2012 | Lutnick et al. | 273/292 |
| 2005/0093229 | A1 | 5/2005 | Dewayne et al. | |
| 2005/0212213 | A1 | 9/2005 | Inglese | |
| 2011/0018203 | A1 | 1/2011 | Lutnick et al. | |
| 2011/0260403 | A1 * | 10/2011 | Lutnick et al. | 273/292 |

OTHER PUBLICATIONS

Website: "The Deck of Dice", Dice Corp., (http://www.panix.com/~sos/bc/deckdice.html), download date: Aug. 8, 2006.
Website: "Deck of Dice (1997)", Dice Corp. , (http://www.boardgamegeek.com/game/5460), download date: Aug. 8, 2006.

(Continued)

*Primary Examiner* — Kurt Fernstrom
*Assistant Examiner* — Dolores Collins
(74) *Attorney, Agent, or Firm* — Mark Miller

(57) ABSTRACT

A card game includes a deck of cards used, for example, to play craps, poker, or any combination thereof.

12 Claims, 5 Drawing Sheets

(56) References Cited

OTHER PUBLICATIONS

Website: "Dice Deck (1987)", (http://www.boardgamegeek.com/game/4474), download date: Aug. 8, 2006.
Website: "DiceDeck 1.1", Softpedia, (http://handheld.softpedia.com/get/Games/Dice/DiceDeck-9124.shtml), download date: Aug. 8, 2006.
Notification of Transmittal of The International Search Report and The Written Opinion of the International Searching Authority for International Application No. PCT/US2007/074039, mailed Jun. 26, 2008, 8 pp.
International Preliminary Report on Patentability for International Application No. PCT/US2007/074039, mailed Feb. 5, 2009, 3 pp.
Twain, Mark, "The Celebrated Jumping Frog of Calaveras County", 1867, 4 pp.
USPTO Office Action for U.S. Appl. No. 11/459,199, dated May 15, 2009, 7 pp.
USPTO Restriction Requirement for U.S. Appl. No. 11/459,199, dated Mar. 20, 2009, 6 pp.
USPTO Examiner Interview Summary for U.S. Appl. No. 11/459,199, dated Oct. 23, 2009 (3 pages).
USPTO Examiner Interview Summary for U.S. Appl. No. 11/459,199, dated Feb. 12, 2010 (3 pages).
USPTO Notice of Allowance and Fees Due for U.S. Appl. No. 11/459,199, dated Mar. 29, 2010 (7 pages).
Australian Examiner's Report for Application No. 2007275043, dated Jun. 4, 2010 (2 pages).
USPTO Office Action for U.S. Appl. No. 12/780,150, dated Dec. 9, 2010 (7 pages).
USPTO Office Action for U.S. Appl. No. 12/780,163, dated Mar. 16, 2011 (8 pages).
USPTO Notice of Allowance and Fees Due and Examiner Interview Summary for U.S. Appl. No. 12/780,163, dated Apr. 5, 2011 (15 pages).
USPTO Office Action for U.S. Appl. No. 12/780,150, dated Dec. 7, 2011 (6 pages).
USPTO Office Action for U.S. Appl. No. 13/176,447, dated Oct. 25, 2011 (9 pages).
Australian Examiner's Report for Application No. 2012201254, dated Jul. 27, 2012 (3 pages).
USPTO Notice of Allowance and Fees Due for U.S. Appl. No. 12/780,150, dated Jul. 10, 2012 (9 pages).
USPTO Office Action for U.S. Appl. No. 13/176,447, dated Jul. 2, 2012 (9 pages).
USPTO Notice of Panel Decision for U.S. Appl. No. 13/176,447, dated Mar. 22, 2013 (2 pages).
USPTO Examiner's Answer for U.S. Appl. No. 13/176,447, dated Aug. 30, 2013 (7 pages).

* cited by examiner

| Hand | Probability for Various Numbers of Decks | | | | | | | | | | | |
|---|---|---|---|---|---|---|---|---|---|---|---|---|
| | 1 | 2 | 3 | 4 | 5 | 6 | 7 | 8 | 9 | 10 | 100 | Infinite |
| 5 of kind flush | 0 | 0 | 0 | 0 | 1.26E-07 | 2.99E-07 | 4.8E-07 | 6.51E-07 | 8.09E-07 | 9.5E-07 | 2.73E-06 | 3.01E-06 |
| 5 of kind | 0 | 0.000196 | 0.00034 | 0.000429 | 0.000488 | 0.00053 | 0.000561 | 0.000585 | 0.000604 | 0.00062 | 0.000753 | 0.000769 |
| straight flush | 0.000282 | 0.000224 | 0.000208 | 0.000201 | 0.000197 | 0.000194 | 0.000192 | 0.000191 | 0.000189 | 0.000189 | 0.000182 | 0.000181 |
| 4 of a kind/flush | 0 | 0 | 0 | 7.85E-06 | 1.57E-05 | 2.25E-05 | 2.8E-05 | 3.26E-05 | 3.64E-05 | 3.96E-05 | 7.12E-05 | 7.54E-05 |
| full house/flush | 0 | 0 | 2.57E-05 | 4.71E-05 | 6.3E-05 | 7.48E-05 | 8.4E-05 | 9.12E-05 | 9.7E-05 | 0.000102 | 0.000145 | 0.000151 |
| trips/flush | 0 | 0 | 0.000154 | 0.000251 | 0.000315 | 0.000359 | 0.000392 | 0.000417 | 0.000437 | 0.000453 | 0.000587 | 0.000603 |
| two pair/flush | 0 | 0.00028 | 0.000463 | 0.000565 | 0.00063 | 0.000674 | 0.000705 | 0.00073 | 0.000749 | 0.000764 | 0.00089 | 0.000904 |
| pair/flush | 0 | 0.001121 | 0.001389 | 0.001508 | 0.001574 | 0.001617 | 0.001646 | 0.001668 | 0.001684 | 0.001697 | 0.001798 | 0.001808 |
| four of a kind | 0.002823 | 0.009811 | 0.012736 | 0.014284 | 0.015238 | 0.015883 | 0.016349 | 0.0167 | 0.016975 | 0.017196 | 0.01901 | 0.019215 |
| full house | 0.01694 | 0.027472 | 0.031107 | 0.032935 | 0.034033 | 0.034766 | 0.035289 | 0.035682 | 0.035987 | 0.036232 | 0.03821 | 0.03843 |
| flush | 0.000282 | 0.000224 | 0.000208 | 0.000201 | 0.000197 | 0.000194 | 0.000192 | 0.000191 | 0.000189 | 0.000189 | 0.000182 | 0.000181 |
| straight | 0.071993 | 0.057186 | 0.053145 | 0.051264 | 0.050176 | 0.049468 | 0.04897 | 0.048601 | 0.048316 | 0.04809 | 0.046308 | 0.046115 |
| trips | 0.090344 | 0.125585 | 0.135699 | 0.140472 | 0.143248 | 0.145063 | 0.146342 | 0.147292 | 0.148025 | 0.148608 | 0.153218 | 0.153718 |
| two pair | 0.203275 | 0.219494 | 0.223695 | 0.225598 | 0.226679 | 0.227375 | 0.227861 | 0.228219 | 0.228494 | 0.228711 | 0.230398 | 0.230577 |
| pair | 0.542067 | 0.501219 | 0.487683 | 0.480973 | 0.47697 | 0.474311 | 0.472418 | 0.471 | 0.4699 | 0.469021 | 0.461937 | 0.461155 |
| nothing | 0.071993 | 0.057186 | 0.053145 | 0.051264 | 0.050176 | 0.049468 | 0.04897 | 0.048601 | 0.048316 | 0.04809 | 0.046308 | 0.046115 |
| Total | 1 | 1 | 1 | 1 | 1 | 1 | 1 | 1 | 1 | 1 | 1 | 1 |

FIGURE 3

| | B | C | D | E | F | G |
|---|---|---|---|---|---|---|
| 2 | | | | | | |
| 3 | | Number of Decks | | 5 | | |
| 4 | | | | | | |
| 5 | | | | | | |
| 6 | | | | | | |
| 7 | | Hand | | Combinations | | Probability |
| 8 | | | | | | |
| 9 | | 5 of kind flush | | IF(E3>=5, 4*6*COMBIN(E3, 5), 0) | | E9/$E$26 |
| 10 | | 5 of kind | | IF(E3>=2, 6*COMBIN(4*E3, 5)-E9, 0) | | E10/$E$26 |
| 11 | | straight flush | | 4*3*E3^5 | | E11/$E$26 |
| 12 | | 4 of a kind/flush | | IF(E3>= 4, 4*COMBIN(E3, 4)*COMBIN(E3, 1)*6*5, 0) | | E12/$E$26 |
| 13 | | full house/flush | | IF(E3>=3,4*COMBIN(E3,3)*COMBIN(E3,2)*6*5, 0) | | E13/$E$26 |
| 14 | | trips/flush | | IF(E3>=3, 4*COMBIN(E3, 3)*COMBIN(E3, 1)*COMBIN(E3, 1)*6*COMBIN(5, 2), 0) | | E14/$E$26 |
| 15 | | two pair/flush | | IF(E3>=2, 4*COMBIN(E3, 2)*COMBIN(E3, 2)*COMBIN(E3, 1)*COMBIN(6, 2)*4, 0) | | E15/$E$26 |
| 16 | | pair/flush | | IF(E3>=2, 4*COMBIN(E3, 2)*(COMBIN(E3, 1))^3*6*COMBIN(5, 3), 0) | | E16/$E$26 |
| 17 | | four of a kind | | 6*COMBIN(4*E3, 4)*COMBIN(20*E3, 1)-E12 | | E17/$E$26 |
| 18 | | full house | | COMBIN(4*E3, 3)*COMBIN(4*E3, 2)*6*5-E13 | | E18/$E$26 |
| 19 | | flush | | 4*(COMBIN(E3, 1))^5*(COMBIN(6, 5)-3) | | E19/$E$26 |
| 20 | | straight | | 3*(4*E3)^5-E11 | | E20/$E$26 |
| 21 | | trips | | COMBIN(4*E3, 3)*COMBIN(4*E3, 1)*COMBIN(4*E3, 1)*6*COMBIN(5, 2)-E14 | | E21/$E$26 |
| 22 | | two pair | | COMBIN(4*E3, 2)*COMBIN(4*E3, 2)*COMBIN(6, 2)*4*COMBIN(4*E3, 1)-E15 | | E22/$E$26 |
| 23 | | pair | | COMBIN(4*E3, 2)*(COMBIN(4*E3, 1))^3*6*COMBIN(5, 3)-E16 | | E23/$E$26 |
| 24 | | nothing | | (COMBIN(4*E3, 1))^5*(COMBIN(6, 5)-3)-E19 | | E24/$E$26 |
| 25 | | | | | | |
| 26 | | Total | | SUM(E9:E24) | | SUM(G9:G24) |

FIGURE 4

| | B | C | D | E |
|---|---|---|---|---|
| 2 | | | | |
| 3 | | Number of Decks | | 5 |
| 4 | | | | |
| 5 | | | | |
| 6 | | | | |
| 7 | | Hand | | Probability |
| 8 | | | | |
| 9 | | 5 of kind flush | | 4*6*(1/24)^5 |
| 10 | | 5 of kind | | (1/6)^5*6-E9 |
| 11 | | straight flush | | 4*3*(1/24)^5*5*4*3*2*1 |
| 12 | | 4 of a kind/flush | | 4*(1/24)^5*6*5*COMBIN(5, 1) |
| 13 | | full house/flush | | 4*(1/24)^5*6*5*COMBIN(5, 2) |
| 14 | | trips/flush | | 4*(1/24)^5*6*COMBIN(5, 2)*COMBIN(5, 3)*COMBIN(2, 1) |
| 15 | | two pair/flush | | 4*(1/24)^5*COMBIN(6, 2)*4*COMBIN(5, 2)*COMBIN(3, 2) |
| 16 | | pair/flush | | 4*(1/24)^5*6*COMBIN(5, 3)*COMBIN(5, 2)*3*2*1 |
| 17 | | four of a kind | | (1/6)^5*6*5*COMBIN(5, 1)-E12 |
| 18 | | full house | | (1/6)^5*6*5*COMBIN(5, 2)-E13 |
| 19 | | flush | | 4*(COMBIN(6, 5)-3)*(1/24)^5*5*4*3*2*1 |
| 20 | | straight | | 3*(1/6)^5*5*4*3*2*1-E11 |
| 21 | | trips | | (1/6)^5*6*COMBIN(5, 2)*COMBIN(5, 2)*COMBIN(2, 1)-E14 |
| 22 | | two pair | | (1/6)^5*COMBIN(6, 2)*4*COMBIN(5, 2)*COMBIN(3, 2)-E15 |
| 23 | | pair | | (1/6)^5*6*COMBIN(5, 3)*COMBIN(5, 2)*3*2*1-E16 |
| 24 | | nothing | | (1/6)^5*(COMBIN(6, 5)-3)*5*4*3*2-E19 |
| 25 | | | | |
| 26 | | Total | | SUM(E9:E24) |

FIGURE 5

CARD GAME

CROSS-REFERENCE TO RELATED APPLICATIONS

This application is a continuation of U.S. patent application Ser. No. 13/176,447, filed Jul. 5, 2011, which is a continuation of U.S. patent application Ser. No. 12/780,163, filed May 14, 2010, now U.S. Pat. No. 7,992,873, which is a continuation of U.S. patent application Ser. No. 11/459,199, file Jul. 21, 2006, now U.S. Pat. No. 7,775,524, all of which are hereby incorporated herein by reference in their entirety.

BRIEF DESCRIPTION OF THE DRAWINGS

FIG. 3 shows a table of probabilities of occurrence for various hand categories according to some embodiments.

FIG. 4 shows a table of formulas for computing probabilities of occurrence for various hand categories according to some embodiments.

FIG. 5 shows a table of formulas for computing probabilities of occurrence for various hand categories according to some embodiments.

DETAILED DESCRIPTION

Figure 1:
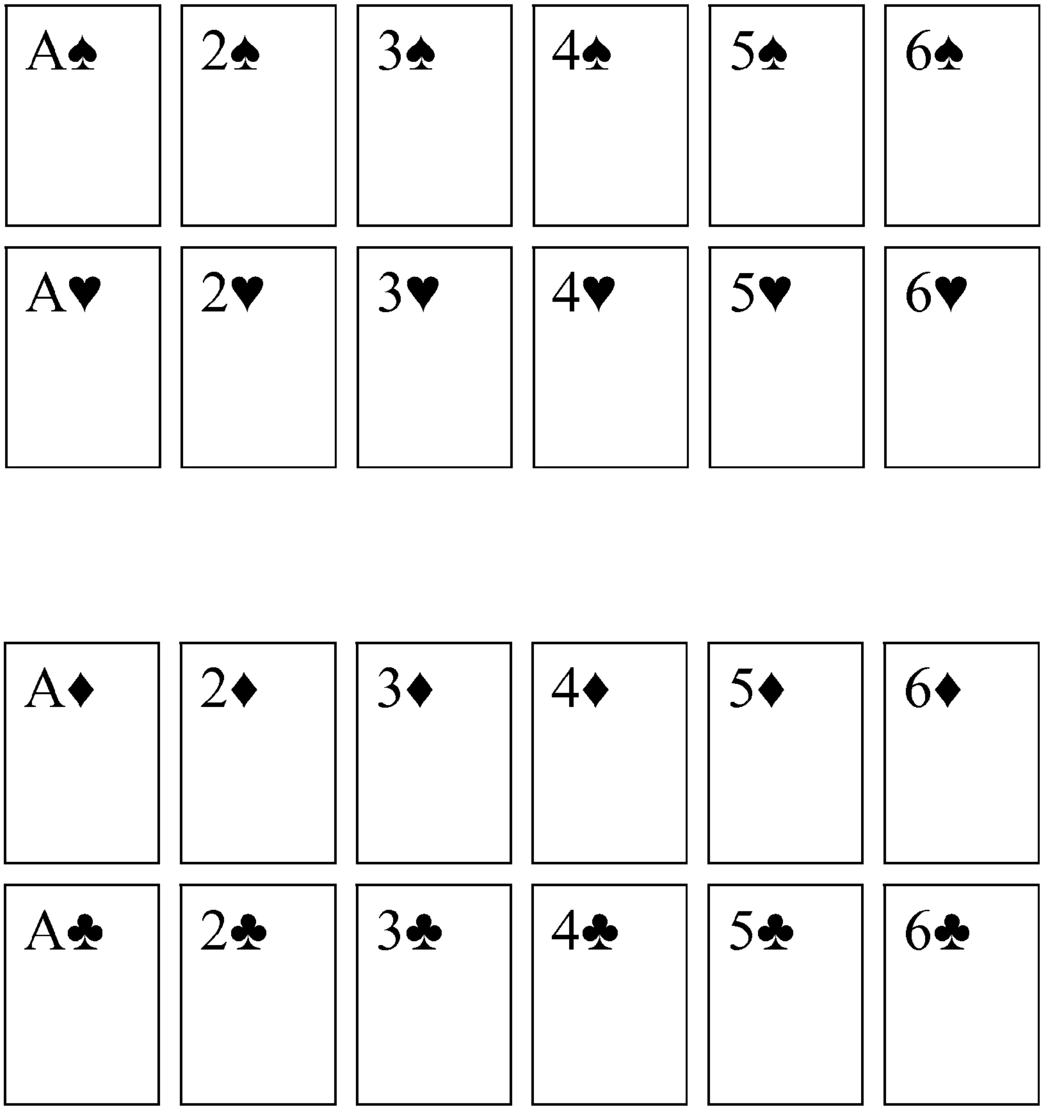
FIG. 1 shows a deck of cards according to some embodiments.

The following sections I-IX provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of" when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, to (iv) a widget and a car, (v) a widget and a wheel, (vi) a car and a wheel, or (vii) a widget, a car and a wheel. The phrase "at least one of" when such phrase modifies a plurality of things, does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data to (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 2, 3, 4, . . . 9) and non-whole numbers (e.g., 1.1, 1.2, . . . 1.9).

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Indication

The term "indication" is used in an extremely broad sense. The term "indication" may, among other things, encompass a sign, symptom, or token of something else.

The term "indication" may be used to refer to any indicia and/or other information indicative of or associated with a subject, item, entity, and/or other object and/or idea.

As used herein, the phrases "information indicative of" and "indicia" may be used to refer to any information that represents, describes, and/or is otherwise associated with a related entity, subject, or object.

Indicia of information may include, for example, a code, a reference, a link, a signal, an identifier, and/or any combination thereof and/or any other informative representation associated with the information.

In some embodiments, indicia of information (or indicative of the information) may be or include the information itself and/or any portion or component of the information. In some embodiments, an indication may include a request, a solicitation, a broadcast, and/or any other form of information gathering and/or dissemination.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single to device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §(b).

The title of the present application and headings of sections provided in the present application are for convenience only, and are not to be taken as limiting the disclosure in any way.

Numerous embodiments are described in the present application, and are presented to for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., to a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered to from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from to those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

VIII. 35 U.S.C. §112, paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a to specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

IX. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application.

X. Embodiments of the Invention

FIG. 1, shows a deck of cards according to some embodiments is shown. The deck may include 24 cards. The deck may include four suits, including spades, hearts, diamonds, and clubs. Within each suit may be included six ranks, including the Ace, 2, 3, 4, 5, and 6. In various embodiments, the Ace represents a 1. In various embodiments, a plurality of decks like the deck depicted in FIG. 1 may be combined into a single larger deck. As will be appreciated by one skilled in the art, ranks and suits may include different labels, or may be represented with different symbols. For example, instead of “clubs”, a suit might be “rabbits”. As will be appreciated, ranks of cards may have different labels than “1”, “2”, etc. In some embodiments, cards may have only ranks and no suits. In some embodiments, cards may have different colors depending on their suits. For example, spades and clubs are black, while hearts and diamonds are red.

Figure 2:
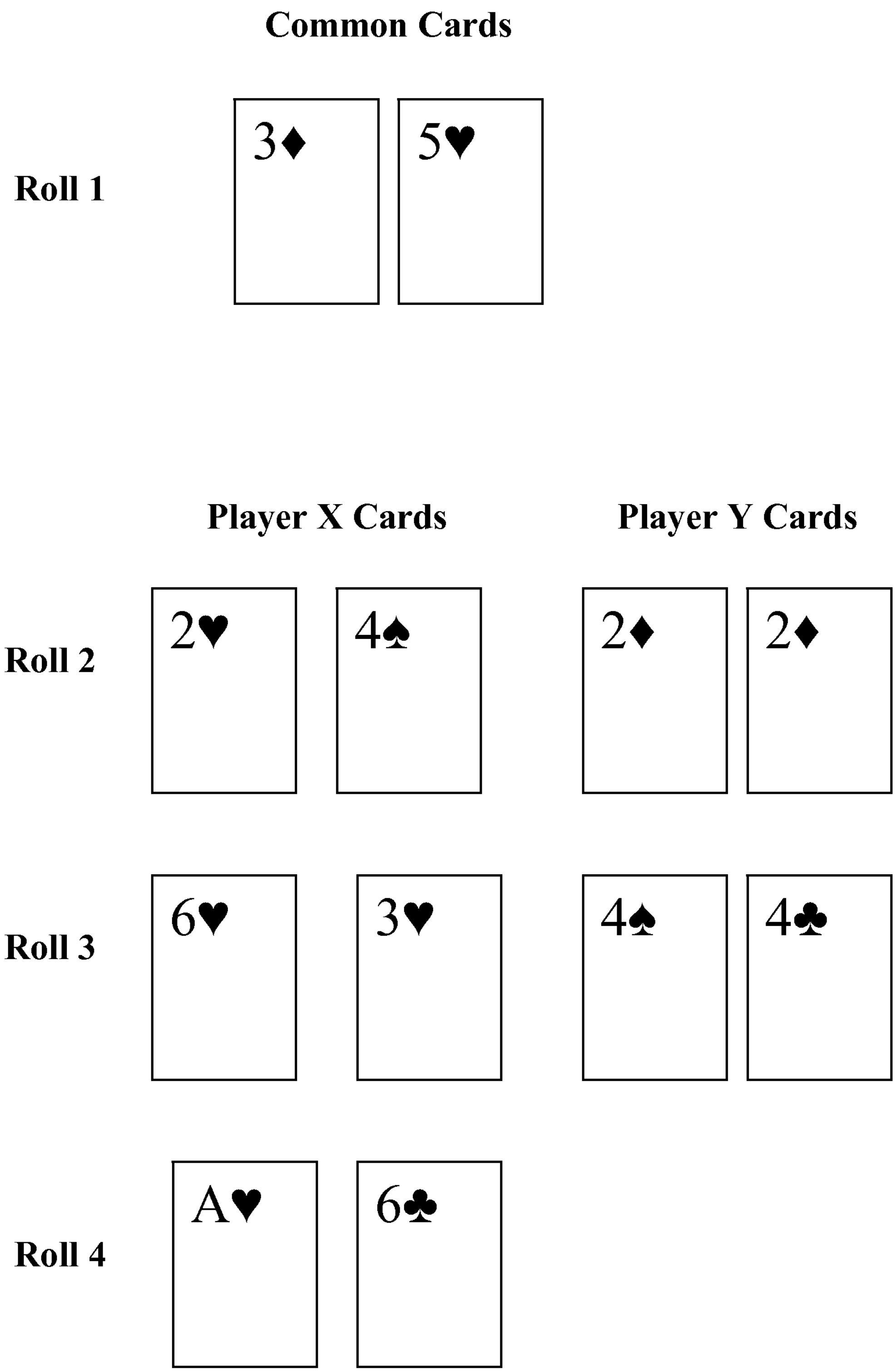
FIG. 2 shows a game according to some embodiments.

According to some embodiments, the deck shown in FIG. 1 may be used to play craps. According to some embodiments, the cards may be used in place of dice. FIG. 2 shows a game of craps according to some embodiments. The game involves two players, “Player X” and “Player Y”. The two players share two common cards which count, for each of the two players, as the first roll of the to game. Note that as used herein, the term “roll” may refer to the dealing of one or more cards. Remaining rolls, “roll 2”, “roll 3” and “roll 4” are made with individual cards effecting only one of the two players. As depicted in FIG. 2, roll 1 establishes a point of 8 (3 plus 5) for both players. Player X loses since, on roll 4, he achieves a 7 without ever achieving the point of 8. Player Y, on the other hand, wins since Player Y achieves the point of 8 on roll 3. Note that as depicted in FIG. 2, Player X and Player Y shared common cards but had different game results. Further, Player X and Player Y completed different numbers of rolls. As will be appreciated by one skilled in the art, additional players may participate in the game. Additional players may likewise share the common cards, while receiving their own individual cards.

Algorithms for Determining the Payout of a Bet in a Craps Game

A player may be paid according to standard rules of craps, with the dealer’s cards regarded as the first roll, and with player cards regarded as all subsequent rolls. For example, suppose the player makes a pass line bet. If the dealer then deals himself a 7 or 11, the player wins. However, if the dealer deals himself a 2, 3, or 12, the player loses. Any other dealer number establishes a “point number”. The player then receives two cards at a time until he is dealt either the point number or a 7. If the player receives the point number first, he wins. If he receives the 7 first, he loses. Player wins are paid at 1:1. Thus, for example, an algorithm for determining a payment for a player may use a table with column A containing the dealer card total, column B containing the total for the last two cards dealt to the player, and column C indicating, for each pair of data in columns A and B, whether the player wins or loses. For instance, an entry of 6 in column A and 6 in column B would correspond to a player win. However, an entry of 6 in column A and 7 in column B would correspond to a player loss. Exemplary entries are shown below.

| Column A: Dealer Card Total | Column B: Card total for Last 2 Player Cards | Column C: Game Result |
|---|---|---|
| 4 | 4 | Player Wins |
| 4 | 7 | Dealer Wins |
| 5 | 5 | Player Wins |
| 5 | 7 | Dealer Wins |
| 6 | 6 | Player Wins |

Bets on Others

In various embodiments, a player may designate another player to bet on. For to example, if a first player feels that a second player is lucky, the first player may bet on the second player. There are various ways in which a first player may indicate that he is betting on a second player, in various embodiments. In some embodiments, the first player may place a physical token on the playing surface, the token displaying a seat number. The token may thereby indicate that the first player is placing a bet on a second player seated in the displayed seat number. In some embodiments, the first player may place a wager inside a specially marked area of the playing surface, where any chips placed in the area are understood to constitute a bet on the second player. In some embodiments, the first player may have specially colored or otherwise marked chips that can be clearly understood to belong to the first player. The first player may then place such chips in front of the second player to indicate a bet on the second player.

In various embodiments, a first player may bet on some combination of players winning. In some embodiments, the first player may place a bet that wins only if every player at a table wins. In some embodiments, the first player may place a bet that wins only if no player at the table wins. In some embodiments, the first player may place a bet that wins if at least a predetermined number of players at a table win.

It will be appreciated by one skilled in the art that a first player may be on the results of a game played by a second player for any type of game, not just craps. For example, a first player may bet that a second player will lose a game of poker.

Card Properties

In some embodiments, a player may place a bet, such as a side bet, on receiving particular card combinations. Such card combinations may include two or more cards of the same suit, two or more cards of the same rank, two or more cards of consecutive rank, or two or more cards of both the same rank and suit. For example, a player may place a bet on receiving two Aces of spades. If, on his first roll (e.g., first deal of two cards), the player receives two Aces of spades, then the bet may win and the player may receive, e.g., a payment equal to ten times his bet. If a player bets on receiving a combination comprising more than two cards, then winning the bet may require more than one “roll”, e.g., more than one deal of two cards.

In some embodiments, a player may place a bet on receiving one or more five-card combinations which constitute hands of poker. For example, a player may bet on receiving a straight, flush, full-house, etc. The player may receive a payment on his bet based on the poker ranking of the five-card combination.

In some embodiments, there is a separate side-bet required of the player in order to receive payment for any card combinations, such as poker combinations, that do not factor into the play of the craps game. It will be appreciated by one skilled in the art that any one of the following may occur: 1) the player wins on a main bet (e.g., a bet on craps) but loses on a side bet (e.g., a bet on receiving a poker card combination); 2) the player wins on the main bet and wins on the side bet;

and 3) the player loses on the main bet and loses on the side bet. In some embodiments, the player may receive a payment based on card combinations unrelated to the game of craps, just for placing his bet on the game of craps.

In some embodiments, cards dealt to a player for a first roll in the game are left visible on the playing surface even as additional cards are dealt as part of additional rolls. In this way, for a given game of craps, all rolls may be visible at once. This may allow a player to win payments based on cards included in multiple rolls.

In some embodiments, a house or casino can modify the rules of craps to account for the particular characteristics of cards. For example, a typical pass line bet will lose if a player rolls a two (i.e., both cards show a one) on his first roll. However, the casino may desire to improve the player odds as part of a promotion. Therefore, in some embodiments, the casino may modify the rules such that a player may roll on his first roll a two consisting of two Aces of spades, and receive his bet back rather than losing his bet. In various embodiments, the use of cards containing ranks as well as suits allows the casino to make more fine-grained divisions between outcomes. Rather than providing a fixed payout for a fixed numerical roll, the same numerical roll may yield different payouts depending on the suits of the cards constituting the roll.

In some embodiments, a player may be prevented from varying the size of his bets. This may help to prevent a player from taking advantage of favorable card distributions remaining in a deck after one or more games have been played, and raising his bets accordingly. In some embodiments, one or more card decks used in a game of craps may be reshuffled after a predetermined number of games of cards are dealt, e.g., to prevent players from taking advantage of favorable card distributions.

In a game of craps, players may compete against one another as to who will win first (e.g., in the fewest number of rolls), who will win at all, who will roll the most different numbers during a game, or based on any other factor. For example, the players may place bets in the main game of craps, but may also place side bets with one another that allow players to compete with one another in addition to competing against the house.

In some embodiments, one or more cards may be dealt face down. With face down cards present, players may compete against one another while maintaining some cards in secret.

In some embodiments, players may bet against one another. A first player wins a bet with a second player if the first player wins his game of craps and the second to player does not win his own game. Suppose, on two respective players' first rolls, a first player is dealt a six face up and another card face down. The second player is dealt a one face up and another card face down. The first player appears to have the more favorable situation since he cannot now achieve two of the losing outcomes (i.e., a two or a three on the first roll), while the second player has only avoided one losing outcome (i.e., a twelve on the first roll). Thus the first player may bet and force the second player to match his bet or fold. The first player may place such a bet even if he knows that his face-down card is also a six, giving him a losing outcome. Thus, the first player may bluff the second player out of the game even when the first player might otherwise lose.

In some embodiments, a player may view one card in a roll. For example, one card of a roll is dealt face up and the other card of the roll is dealt face down. The player may then be given the opportunity of placing a bet with a modified payout odds. For example, after the first card in a roll is visible to a player, the player may make a "pass" bet. However, rather than being paid 1:1 as in a standard game, the player may be paid only 8:10. The second card in the roll may then be dealt and/or revealed.

In various embodiments, special cards may be added to the one or more decks used for craps. Such cards may include, for example, sevens, wild cards, or jokers. A player who is dealt a seven, for example, may use that card in isolation as his roll, and may thereby win on his first roll. Wild cards may be used as any of a set of numbers, depending on which is most favorable to a player.

In some embodiments, the one or more decks used for craps or other games can be weighted or stacked to include more of one type of card than another. The weighting may prove either favorable or unfavorable to the player depending on the objective of the casino. For example, as a way to favor the player, the casino may add extra "five" cards to the deck. The extra five cards make it less likely that a player will roll a two, three, or twelve on his first roll, since none of these combinations include a "five card".

Embodiments Special to Multiple Players

In some embodiments, one player may act as the house against one or more other players. The house player may thus be responsible for paying winning bets to other players, but may benefit from receiving losing bets from other players.

In some embodiments, players may receive bonus payments based on the results of multiple players at a table. For example, players may receive a bonus if everyone wins or if everyone loses at a table.

In some embodiments, a single player may play multiple games simultaneously. For example, a player may be dealt two initial hands, each representing a separate initial roll. Depending on the initial rolls, the player may be dealt further cards in each separate game. The player may thus win one game and lose another, win both, or lose both.

Tracking Bets

In order to facilitate the tracking of bets from multiple players in multiple different games of craps, betting options may be limited. For example, betting options may be limited to pass or don't pass bets.

Physical Design of the Table

Various embodiments may include modified table designs. Tables may include chairs since there may be a limited playing surface area, a correspondingly limited number of hands that can be accommodated at once, and therefore, an ability to seat all current players. In various embodiments, a table may be constructed without side walls extending above the surface. When cards are used, there may be no need for a wall against which dice are thrown. In some embodiments, a table may include a card shuffler, card shoe, and/or card reader.

Anti-Cheating Efforts

Various embodiments may limit the possibility of foul play. House rules may prevent players from touching cards, may require the dealer to burn a card before one or more rolls, and/or may require a player to remove his hands from the playing surface after betting.

Common Cards

In various embodiments, one or more common cards are dealt. Common cards may affect the outcomes of games and or bets placed by a plurality of players. In some embodiments, all cards dealt at a table apply to all players. Therefore, for example, two players who have both placed the same type of bet (e.g., pass) will have the same result (e.g., win, lose).

In some embodiments, common cards account for one or more rolls, while private or individual cards account for one or more additional rolls. For example, the dealer deals a 4 and a 2 as common cards, establishing a 6 as a point for all players.

Thereafter, each player is dealt two cards. A first player may receive a 5 and a 1, thereby matching the point and winning. However, a second player may receive a 4 and a 3, thereby obtaining a 7 and losing. Thus, in some embodiments, two or more players can share a set of common cards, yet achieve different game outcomes (e.g., win versus lose).

In some embodiments, cards dealt to or on behalf of a first player may apply to a second player, possibly in addition to applying to the first player.

Giving Players Control

In craps played with dice, players often enjoy feeling in control by being able to throw the dice themselves. Various embodiments of craps and other games played with cards provide the player with at least a feeling of control. In some embodiments, a player may choose which of two hidden cards will be dealt to him. In some embodiments, a player may choose one or more discards or burn cards to to be made from the top of one or more decks used to play a game. The player may be dealt the one or more cards after the burn cards.

Altering the Deck Markings

In various embodiments, the pips on the cards can be patterned as on dice rather than as they are on standard cards. Thus the face of the cards may be made to look more like die faces.

In various embodiments, the "A" or Ace symbol of a standard deck of cards may be altered to be "1". This may avoid disappointment from a player who receives Ace-Ace on a first roll, thinks he has a great hand, and never-the-less loses.

Forming/Manufacturing/Packaging the Deck

In various embodiments, the one or more decks are manufactured only with cards 1-6. In various embodiments, the one or more decks are formed from standard decks of cards by removing all cards other than the 1-6, with an Ace treated as a 1.

For example, the one or more decks used in various embodiments may be formed by removing all sevens, eights, nines, tens, jacks, queens, and kings from a standard deck.

Various embodiments may employ standard decks comprising Aces, 2-10's, jacks, queens, and kings. However, the cards may be given different interpretations such that each is interpreted as a card 1-6. For example, a seven is interpreted as a one, an eight interpreted as a two, a nine as a three, a ten as a four, a jack as a five, a queen as a six, and a king as a one.

Various embodiments use a plurality of decks, where each deck consists of 24 cards, with cards 1-6 in each of the four suits, namely spades, diamonds, hearts, and clubs. The plurality of decks may be combined into a single deck. The single deck may be used for multiple games, with cards depleted from the deck as more games are played. When the deck has been depleted to some extent, the cards may be reshuffled and the full deck used again.

Computer Implemented Embodiments

One skilled in the art will appreciate that embodiments described herein may be implemented electronically by computers. In some embodiments, a computer may simulate play from an infinite deck. An infinite deck may be simulated by immediately replacing any card that has been dealt so that the deck remains undepleted. The use of a simulated infinite deck means that the dealing of a first card does not change the odds of any second card, even a second card of the same rank and suit as the first card. In some embodiments, only each new "roll" of two cards is from an infinite deck. Thus, the second card in a roll may be constrained to be a card of a different rank and or suit from that of the first card in the roll.

As will be appreciated, a computer can simulate a deck of cards in many ways. For example, to simulate a single deck, a computer may store integers 1-24 in 24 separate memory locations. Each integer may represent a card, with a table or any other suitable function providing a mapping between integers and cards. For example, the integer 2 may map to the 2 of clubs. The integer 24 may map to the six of spades. A computer may deal a card by using a random number generator to generate a random integer between 1 and 24, inclusively. If the computer simulates an infinite deck, the integers stored in memory do not change. However, if the computer simulates a finite deck, then the selection of a first random number will, after the corresponding card has been "dealt", cause the first random number to be erased from the list of integers stored in memory. Thereafter, if the random number generator outputs a second random number equal to the first random number, the random number generator will be caused to output another random number since the first random number is no longer available.

In various embodiments, a computer may simulate a game which uses 1, 2, 3, 4, or any number of combined decks, any number of cards, any number of suits of cards, and/or any number of ranks of cards.

In various embodiments, a player may select one or more wild or special cards to to be added to the one or more decks used for play. For example, a "7" card, which is not normally in the one or more decks, may be added. A player receiving a 7 card on the initial draw could be considered to have rolled a 7 and thereby win the game (e.g., in a game of craps).

Odds

In various embodiments, a table of data is used to determine probabilities corresponding to various hands of poker. The table may include one column containing descriptions of categories of hands of poker. Exemplary categories are: 5 of a kind flush; 5 of a kind; straight flush; straight; 4 of a kind flush; 4 of a kind; full house flush; full house; flush; 3 of a kind flush; 3 of a kind; 2 pair flush; 2 pair; pair flush; pair; and nothing. The table may include another column containing probabilities. In various embodiments, the table may be used to generate a set of payout ratios, such that the payout percentage (expected payout as a percent of amount wagered) is less than 100%. The expectation function takes the product, for each possible hand category, of the probability and the corresponding payout ratio. The sum of all these products is then determined to yield the output of the expectation function, in this case the payout percentage.

A new table may be generated with one column containing descriptions of categories of poker hands, and another column containing payout ratios determined as above for the corresponding categories. The new table may be used during play of a poker game to determine a player's payout based on a category of hand achieved by the player.

FIG. 3 depicts an exemplary table showing the probabilities of various five-card hands occurring on a first deal for various numbers of decks.

FIG. 4 depicts an exemplary table showing the formulas for the probabilities of various five-card hands occurring on an initial deal, and for a variable number of decks. Note that the combine (a, b) formula means a!/(b!(a−b)!). Further, as to depicted in FIG. 4, variables consisting of a letter and number, such as "E3", refer to the contents of the cell in the column described by the letter and the row described by the number. In FIG. 4, for example, the contents of cell E3 is 5. It will be appreciated that the formulas depicted in FIG. 4 represent formulas understood by a common spreadsheet program, Microsoft Excel®, but may be written using any other equivalent mathematical or computer notation. In various embodiments, a table of data contains two columns, one column containing descriptions of hands, and one column containing formulas for computing the probabilities of such hands occurring.

FIG. 5 depicts an exemplary table showing the formulas for the probabilities of various five-card hands occurring on an initial deal from an infinite or simulated infinite deck.

Processes According to Some Embodiments

In various embodiments, the house may receive a first wager from a first player and a second wager from a second player, wherein the value of the second wager is the same as the value of the first wager. For example, both the first player and the second player place a wager of $10. The house may shuffle a deck of cards, wherein each card displays indicia indicative of an integer of the set {1, 2, 3, 4, 5, 6}. The indicia may include the numerals one through six, e.g., Arabic, Roman, Kanji, etc. The letter A, or the word "Ace" may indicate the integer 1. The house may generate a first random number by drawing first and second cards from the deck, determining first and second integers associated, respectively, with the first and second cards by reference to the indicia on the cards, and determining the sum of the first and second integers to yield the first random number. For example, if the indicia on the first and second cards are the numerals "3" and "5", respectively, then the associated integers may be 3 and 5. The first and second cards may constitute common cards for use by all players in a game. The first random number may thus establish a point for all players. If the first random number is a 2, 3, or 12, then all players may lose. If the first random number is a 7 or 11, then all players may win.

The house may generate a second random number. For example, the second random number is generated after the first random number. The house may generate the second random number by drawing third and fourth cards from the deck, determining a third integer associated with the third card, determining a fourth integer associated with the fourth card, and determining the sum of the third and fourth integers, thereby determining the second random number. The third and fourth cards may be private or individual cards for the first player. The second random number may be associated with the first player.

The house may generate a third random number. For example, the third random number is generated after the second random number. The house may generate the third random number by drawing fifth and sixth cards from the deck, determining a fifth integer associated with the fifth card, determining a sixth integer associated with the sixth card, and determining the sum of the fifth and sixth integers, thereby determining the third random number. The fifth and sixth cards may be private or individual cards for the second player. The third random number may be associated with the second player.

The house may determine a payment for the first player based on an algorithm. The algorithm may be the rules of craps, which translate numbers achieved by a given player during a game into win or loss outcomes, and which thus determine the payment due to the player in light of his wager. Thus, if the first random number is a seven or eleven, the first player may receive twice his wager back. If the first player still has possession of his wager, he may receive a payment equal to his wager, in addition to keeping his wager. If the first random number is a two, three, or twelve, the player may lose his wager and receive nothing back. If the second random number is equal to the first random number, the first player has achieved the point and therefore the first player may receive twice his wager, or a payment equal to his wager if he is still in possession of his wager. If the second random number is a seven, then the player may lose his wager and receive nothing back.

The house may determine a payment for the second player based on the same algorithm, e.g., the rules of craps. However, with the second player, the inputs to the algorithm are different, since the second player has been dealt different cards than the first player. In other words, with the second player, the algorithm compares the third random number to the first random number to see if the second player should receive nothing back or should receive twice his wager. This is because the third random number is associated with the second player. In particular, the payment for the second player may be different from the payment for the first player, even though the first player and the second player have made the same wager. This is because the first player may have won his game and the second player may have lost his game, or vice versa. If the first random number is one of the set {4, 5, 6, 8, 9, 10}, the second random number is seven, and third random number is equal to the first random number, then the first player will have lost while the second player will have won. Accordingly, the first player will receive nothing while the second player may receive twice his wager. As will be appreciated, various embodiments may include more than two players.

In some embodiments, one person may place a bet on the outcomes obtained by each member or every member of a group. In some embodiments, two players play separate games of craps, a first player receiving a first set of two cards, and a second player receiving a second set of two cards, each from a deck of cards comprising the cards depicted in FIG. 1. The first player and the second player may receive cards from separate decks, or the first player and the second player may receive cards from the same deck. A first payment is determined for the first player and a second payment determined for the second player based on the rules of craps. The first payment is provided to the first player and the second payment provided to the second player. A third payment is determined based on the first set of two cards and based on the second set of two cards. Thus, the third payment may come from a group result, in which two or more players contribute to the group result. The group result may be based on the cards players receive while playing craps, but the group result may be determined in a manner either dependent or wholly independent of the rules of craps.

The third payment may be a non-zero payment if both the first set of two cards and the second set of two cards are each part of winning craps games. For example, the third payment may be non-zero if the first set of two cards taken together with a third set of two cards dealt to the first player, and the second set of two cards taken together with a fourth set of two cards dealt to the second player, each result in winning craps games.

The third payment may also be non-zero if the first player and the second player receive some number of identical cards. For example, the third payment may be non-zero only if all cards included in the first set of two cards and the second set of two cards are identical (e.g., all are aces of spades).

Once the third payment is determined, a portion of the third payment may be provided to the first player, and a portion provided to the second player. The portions may be equal or may depend on the size of a wager received from the first player relative to a wager received from the second player.

As will be understood by one skilled in the art, the third payment may, in various embodiments, be based on the results of more than two players, e.g., based on three players, based on four players, etc. The third payment might constitute a payment for a bet on a group outcome. It will also be appreciated that a bet may be made on a group outcome for games other than craps. For example, a third payment may be made for a bet on the results of multiple players in a game of poker. For example, a third payment may be made if more than two players in a game of poker obtain a full house or better.

In various embodiments, a payment made (e.g., to a bettor) for a bet made on a group outcome may vary based on the number of players that must contribute to the group outcome. For example, a bettor who bets that five out of six people will win might be entitled to a larger payment than is a bettor who bets that three out of to six people will win.

FURTHER EMBODIMENTS

In various embodiments, a player may buy insurance against a particular roll coming up 7. For example, a player may have significant money at risk on a game and may be worried about a particular roll of the dice. Therefore, the player may purchase insurance to protect his money at risk on the role. In one embodiment, the player is provided a betting option for "7". The player may bet an amount equal to ¼ his total money at risk in order to insure it.

Applicants claim:

1. A method comprising:

receiving, by a computing device, a first wager from a first player in a game of competitive craps;

receiving, by the computing device, a second wager from a second player in the game of competitive craps;

generating, by the computing device, a first random number by summing a first two integers together, in which the first random number is assigned as a first initial roll to the first player in the game of competitive craps and in which the first random number establishes a first point for the first player;

generating, by the computing device, a second random number by summing a second two integers together, in which the second random number is assigned as a second initial roll to the second player in the game of competitive craps and in which the second random number establishes a second point for the second player;

generating, by the computing device, subsequent random numbers for each of the first and second player until one of the two players achieves either a reroll of a respective established point or a craps roll; and determining, by the computing device, one of the first player and the second player to be the winner of the competitive game of craps such that the winner is the player that at least one of a) first achieved a reroll of the respective established point in a subsequent random number generation and b) did not achieve a craps roll in a subsequent random number generation.

2. The method of claim 1, in which the first two integers are generated by drawing a first two cards from a deck of cards and in which the second two integers are generated by drawing a second two cards from the deck of cards.

3. The method of claim 1, in which the deck of cards consists of cards that display indicia indicative of an integer of the set {1, 2, 3, 4, 5, 6}.

4. The method of claim 1, including: providing a payment to the winner of the competitive game of craps from the first wager and second wager.

5. The method of claim 1, including: providing an opportunity to place a further wager in the competitive game of craps after the first point and the second point are established.

6. The method of claim 5, including: presenting only one of the first integers to the second player and one of the second integers to the first player before providing the opportunity.

7. An apparatus comprising:

a computing device; and a non-transitory medium having stored thereon a plurality of instructions that when executed by the computing device cause the apparatus to:

receive a first wager from a first player in a game of competitive craps;

receive a second wager from a second player in the game of competitive craps;

generate a first random number by summing a first two integers together, in which the first random number is assigned as a first initial roll to the first player in the game of competitive craps and in which the first random number establishes a first point for the first player;

generate a second random number by summing a second two integers together, in which the second random number is assigned as a second initial roll to the second player in the game of competitive craps and in which the second random number establishes a second point for the second player;

generate subsequent random numbers for each of the first and second player until one of the two players achieves either a reroll of a respective established point or a craps roll; and determine one of the first player and the second player to be the winner of the competitive game of craps such that the winner is the player that at least one of a) first achieved a reroll of the respective established point in a subsequent random number generation and b) did not achieve a craps roll in a subsequent random number generation.

8. The apparatus of claim 7, in which the first two integers are generated by drawing a first two cards from a deck of cards and in which the second two integers are generated by drawing a second two cards from the deck of cards.

9. The apparatus of claim 7, in which the deck of cards consists of cards that display indicia indicative of an integer of the set {1, 2, 3, 4, 5, 6}.

10. The apparatus of claim 7, in which the instructions cause the apparatus to: provide a payment to the winner of the competitive game of craps from the first wager and second wager.

11. The apparatus of claim 7, in which the instructions cause the apparatus to: provide an opportunity to place a further wager in the competitive game of craps after the first point and the second point are established.

12. The apparatus of claim 11, in which the instructions cause the apparatus to: present only one of the first integers to the second player and one of the second integers to the first player before providing the opportunity.

* * * * *